Oct. 23, 1962     J. C. MAXSON     3,059,531
EYE GLASSES
Filed March 9, 1959
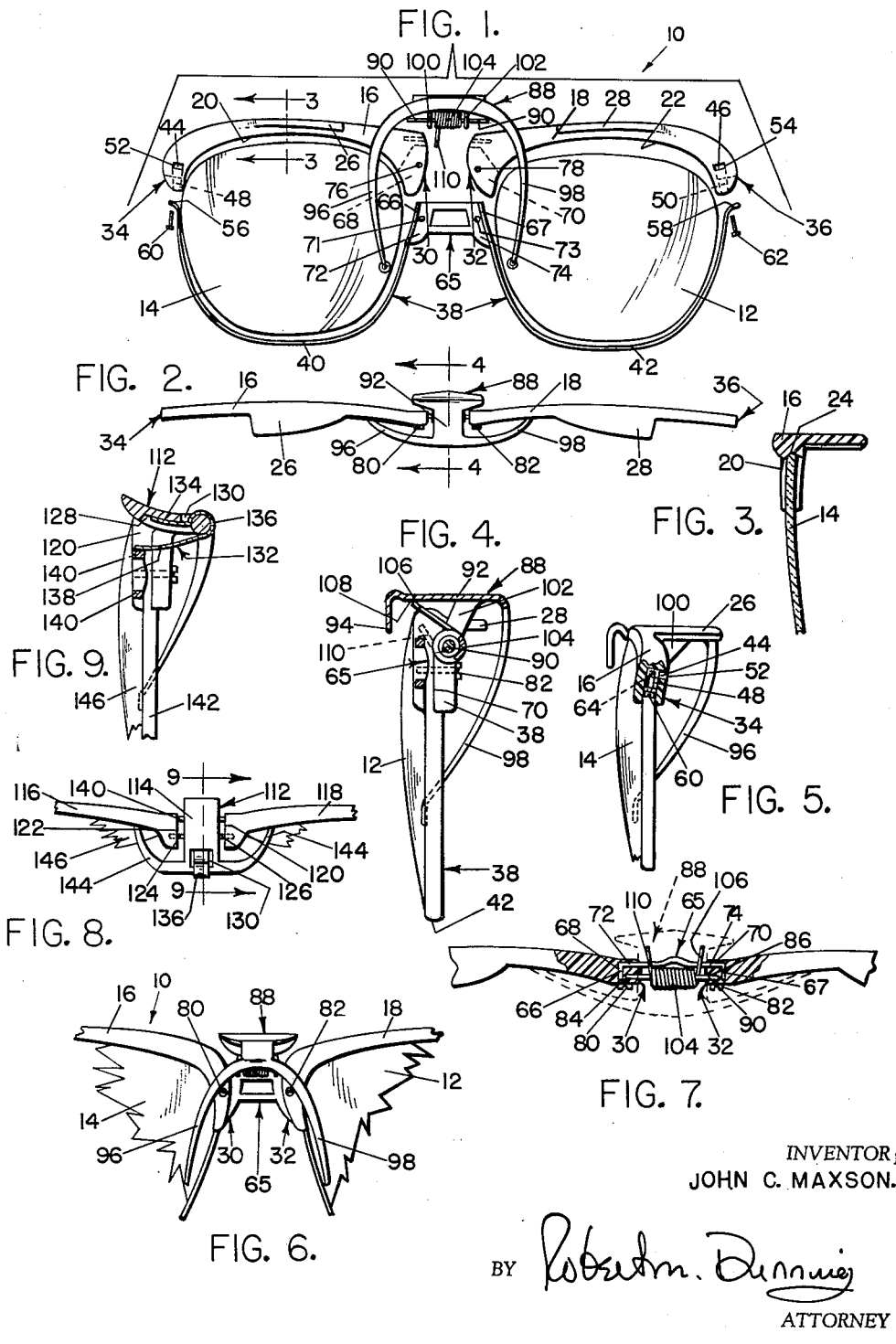
INVENTOR;
JOHN C. MAXSON.
BY *Robert M. Dunning*
ATTORNEY

United States Patent Office

3,059,531
Patented Oct. 23, 1962

3,059,531
EYE GLASSES
John C. Maxson, 1885 Bayard Ave., St. Paul, Minn.
Filed Mar. 9, 1959, Ser. No. 797,993
7 Claims. (Cl. 88—41)

This invention relates to eye glasses and deals particularly with auxiliary glasses designed to be fastened to and supported by a pair of ordinary spectacles. This arrangement is particularly well adapted for use as sun glasses.

Auxiliary glasses of the same general type have been produced in volume for several years. In some such constructions, a resilient clamp is pivoted to the bridge portion of the auxiliary glasses and includes a pair of fingers which are urged against the inner surfaces of the lenses of the ordinary spectacles to hold the auxiliary glasses in place. The frame of the auxiliary glasses is provided with opposed notches on opposite sides of the connecting bridge portion and above the same. A pivot shaft which supports the resilient clamp has its ends engaged in the notches. The plastic body of the frames is then compressed together to partially close the notches, holding the pivot shaft engaged.

While the structure has proven very successful, it has certain disadvantages. The notches remain partially open, and thus detract somewhat from the appearance of the glasses. Also, unless the notches are closed to the proper extent, an end of the pivot shaft may become disengaged. It is an object of the present invention to correct these difficulties.

An object of the present invention lies in the provision of auxiliary eye glasses having a pivotally supported clamp and having a pivot shaft supporting the clamp and having its ends engaged in opposed sockets in the inner ends of the frame members overlying the lenses. By this means the pivot shaft is securely anchored in place. As the ends of the shaft fill the sockets, the frame is smoother and neater in appearance than in the past.

A feature of the present invention lies in providing auxiliary glasses including, in general, a pair of lenses, a frame piece designed to extend along the upper edge of each lens, a resilient clamp assembly, and a bridge element which preferably includes bands designed to extend along the under surface of the lenses. The frame pieces include opposed sockets to accommodate the ends of the clamp pivot shaft. The frame pieces also include parallel slots which are of angular or L-shaped section. The slots are at substantially right angles to the sockets. The bridge element includes generally parallel flanged side edges which engage into the slots and hold the frame pieces from separation.

A further feature of the invention lies in the manner in which the frame members, bridge portion and pivot shaft and clip assembly are put together. The clip and its spring are assembled upon the pivot pin, and the ends of the pivot pin are then inserted into the opposed sockets of the frame members. The frame members are then held in properly spaced relation by insertion of the parallel flanges of the bridge portion into the L-shaped slots in the inner ends of the frame members. When thus engaged, the bridge member holds the frame members from relative twisting and from separation, thus holding the ends of the pivot shaft in its sockets.

Other objects and novel features will appear from the following description taken in connection with the drawings wherein:

FIGURE 1 is an exploded rear plan view of the component parts of the auxiliary glasses.

FIGURE 2 is a top edge view of my invention.

FIGURE 3 is a fragmentary vertical sectional view of the parts assembled, taken substantially on line 3—3 of FIGURE 1.

FIGURE 4 is a vertical sectional view through the intermediate portion of the clip assembly as it is mounted on auxiliary glasses.

FIGURE 5 is an end elevational view of the glasses with portions of a frame member shown in section.

FIGURE 6 is a rear fragmentary plan view of the clip in assembled relation to the frame members and lenses.

FIGURE 7 is a fragmentary view, partially in section showing the clip mounting means with greater clarity.

FIGURE 8 is a plan view of a modified clip assembly shown attached to a frame member and lenses.

FIGURE 9 is a sectional view thru line 9—9 of FIGURE 8.

Referring now to the drawings, and in particular to FIGURE 1, a pair of auxiliary glasses generally indicated by the numeral 10 comprises a pair of lenses 12 and 14 of any desired optical property. Each lens is provided with generally horizontal frame members 16 and 18. These frame members are preferably formed of a plastic material and may be injection molded, having dimensions which are suitable from the standpoint of functioning as frame members as well as having visual qualities which enhance the outward appearance of the glasses. The edges 20 and 22 of the frame members may be provided with suitable grooves or recesses such as 24 to contain the abutting edges of the lenses (see FIGURE 3). As shown in FIGURE 2, tabs 26 and 28 are provided on the frame members 16 and 18 extending rearwardly to rest on the upper edges of the frames of ordinary spectacles (not shown) when the glasses 10 are in use.

The inner opposed ends of the frame members 16 and 18 are generally indicated by the numerals 30 and 32 and the opposite outer ends are indicated in general by the numerals 34 and 36. These numerals will be referred to in the later description of attached parts.

A singular frame member indicated by the numeral 38 encloses the remaining portion of the lenses as at 40 and 42. The member 38 is connected to the outer ends 34 and 36 of the frame members. This connection is made by inserting metallic blocks 44 and 46 into upwardly extending cavities 48 and 50 disposed into the ends 34 and 36 of the frames 16 and 18. These blocks are inserted through lateral openings 52 and 54 on either side of the ends 34 and 36. The cavities 48 and 50 are somewhat smaller in diameter than the area containing the blocks and the openings 52 and 54 so that the blocks will remain in place. The extremities 56 and 58 of the singular frame member 38 are angularly bent and are provided with suitable apertures to accommodate threaded screws 60 and 62. The bent portions of the extremities are inserted into the cavities 48 and 50 and are held therein by the screws 60 and 62 which are threaded into aligned openings such as 64 in the block 44.

The singular frame member 38 is further provided with a connecting bridge 65 which may be formed integrally with the frame 38. The bridge is designed to be inserted into horizontally disposed slots 68 and 70. As is clearly shown in FIGURES 1 and 7, the edges of the bridge 65 are provided with angularly bent portions 66 and 67 which are disposed into corresponding angular recesses within the slots 68 and 70. This feature adds stability to the connection between the lenses and their respective horizontal frame members.

The slots are disposed into the inner ends 30 and 32 of the frame members 16 and 18 as is clearly shown in FIGURES 1 and 7. The horizontal surfaces 72 and 74 of the bridge 65 are provided with threaded apertures 71 and 73 in alignment with openings 76 and 78 which are disposed through the rearward side of the ends 30 and 32 in proximity with the slots 68 and 70. The bridge is inserted into the slots and held thereto by the screws 80 and 82. The bent portions 66 and 67 of the bridge 65 when fitted into the recesses within the slots tend to hold the lenses and their respective frame members together so that the screws 80 and 82 may be readily inserted and properly threaded during the assembly of the parts.

The frame members 16 and 18 are provided with horizontal bores 84 and 86 which are disposed inwardly of the inner opposed ends 30 and 32. These bores are in opposed relation and are positioned adjacent the slots 68 and 70 as best seen in FIGURE 7 and slightly above the slots as best shown in FIGURE 1. The cross-sectional thickness of the ends 30 and 32 should be sufficient to accommodate the slots and the bores and thus may be slightly thicker than the remaining portions of the frame members 16 and 18.

For the purpose of retaining the auxliary glass on a pair of ordinary spectacles, a clip assembly indicated generally by the numeral 88 is disposed medially upon the glasses and is secured to the frame members 16 and 18 in a manner as will presently be described.

As is best seen in FIGURE 7, the ends of the horizontal shaft 90 are disposed into the bores 84 and 86. As is more clearly shown in FIGURES 2 and 4, the clip 88 has a generally rectangular body portion 92 having a forwardly positioned finger tab 94 and rearward downwardly depending tines 96 and 98. The body 92 is further provided with a pair of angular downwardly depending ears 100 and 102 provided with openings for mounting the body 92 on the horizontal shaft 90. The ears are in spaced parallel relation to accommodate a coil spring 104 which is wound around the shaft 90 between the ears 100 and 102. One end 106 extends tangentially from the coil spring sufficiently to bear against the underside of the body 92 as at 108. The other end 110 of the spring extends similarly to bear against the bridge 65 as best seen in FIGURE 4. The spring, when assembled in the prescribed manner within the clip assembly is flexed to a degree such as to normally bias the clip body rearwardly thereby urging the depending tines 96 and 98 in a forward direction against the lenses 14 and 16 while at the same time enabling the tines to be moved in a backward direction when it is desired to place the glasses on a pair of ordinary spectacles.

Thus, it is seen that the component parts of the auxiliary glasses may be readily assembled into the finished article without resorting to expensive manufacturing fixtures.

The clip mounting shaft is assembled with the ends of the shaft inserted into the opposed bores in the inner ends of the horizontal frame members and the subsequent connecting of the bridge to the horizontal frame members is a particularly effective connection, both from the standpoint of convenience in assembly and for the production of an article which will be durable. The screws used to connect the bridge to the horizontal frame members tend to be held more securely due to the action of the tension spring within the clip body bearing against the bridge. However, losse screws will not mean that the glasses will become disassembled. The particular shape of the bridge edges which extend into the slots of the horizontal frame members will hold the parts assembled unless the screws become completely unthreaded.

FIGURES 8 and 9 of the drawings illustrate a modified clip assembly including a modified form of spring means for biasing the clip. The clip, generally indicated by the numeral 112, includes a body portion or finger tab 114 which is pivotally mounted between the frame members 116 and 118. The inner opposed ends 120 and 122 are provided with bores similar to the bores of the structure shown in FIGURES 1 thru 7. The pivoting element may include a pair of stub shafts or pivots 124 and 126 formed integrally with the tab 114 and extending outwardly from the edges thereof. The undersurface of the tab 114 is recessed as at 128 and is provided with an aperture 130 located adjacent the rearward edge. The clip is biased by a leaf spring 132 having one end 134 disposed into the recess 128 and in engagement with the undersurface of the tab. The spring extends upwardly through the aperture 130, rearwardly over the rear end 136 of the tab 114, and forwardly so that the end 138 bears against the upper surface of the bridge 140. The bridge and frame structure 142 are identical with that of the modification illustrated in FIGURES 1 thru 7. This arrangement of parts will insure that the tines 144 will be urged forwardly against the lenses 146 or against the lenses of the spectacles to which the glasses are attached. The tines 144 are secured to the rear portion 136 of the tab 112 and extend downwardly therefrom.

From the foregoing specification it will become apparent that the invention disclosed will adequately accomplish the function for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.

I claim:

1. A pair of auxiliary glasses designed to be removably attached to a pair of ordinary spectacles, said glasses comprising a pair of lenses, a pair of substantially straight horizontal frame members disposed adjacent the upper edges of said lenses, a framing member enclosing the remaining edges of said lenses, means connecting said framing member to opposite outer ends of said horizontal frame members, a separate medial bridge formed integrally with said framing member, means connecting said bridge to inner opposed ends of said horizontal frame members, a bore extending inwardly from each of said inner opposed ends of said horizontal frame members, the portion of said horizontal frame ends surrounding said bores being of relatively thickened cross-section, a horizontal shaft extending into said bores, said shaft being engaged in said bores prior to the connection of said bridge to said inner ends of said horizontal frame members, a spring biased clip assembly rotatably mounted on said shaft, said assembly including a clip body, a pair of opposed ears depending from said body provided with openings through which said shaft passes, a tension spring mounted on said shaft beneath said clip body having one extended end portion bearing against said clip body and another extended end portion bearing against said bridge of said framing member for holding said clip in a closed position.

2. The structure as set forth in claim 1 and in which said means connecting the framing member to the outer ends of said horizontal frame members includes cavities disposed upwardly into the outer extremities of said horizontal frame members, blocks in said cavities, threaded openings in said blocks, ends on said framing members bent to be inserted into said cavities and adjacent said blocks, and apertures in said ends to accommodate screws which are threaded into said blocks.

3. A pair of auxiliary glasses designed to be removably connected to a pair of ordinary spectacles, said glasses comprising a pair of lenses, a pair of frame members connected to said lenses, a separate medial bridge detachably connecting said frame members to hold the same in properly spaced relation, the inner opposed ends of said frame members having opposed aligned bores forming sockets therein, a spring biased clip assembly adapted to overlie said bridge and having pivotal attaching means including aligned pivot ends projecting in opposite directions from said assembly, said pivot ends being engageable in said sockets prior to attachment of said bridge to said frame members and being held from removal from said sockets when said bridge is attached to said frame members.

4. The structure as set forth in claim 3 and in which said clip assembly includes a main body portion having an aperture disposed therethrough adjacent its rearward end, a leaf spring having one end inserted through said aperture to bear against the underside of said body and having a bight portion in engagement with said rearward end of said body, the other end of said spring bearing against said medial bridge.

5. The structure of claim 3 and in which the spring biased clip assembly includes a leaf spring interposed between a portion of said clip assembly and said bridge.

6. A pair of auxiliary glasses designed to be removably connected to a pair of ordinary spectacles, said glasses comprising a pair of lenses, a pair of frame members connected to said lenses, a separate medial bridge detachably connecting said frame members to hold the same in properly spaced relation, the inner opposed ends of said frame members having opposed aligned bores forming sockets therein, a spring biased clip assembly adapted to overlie said bridge and having pivotal attaching means including aligned pivot ends projecting in opposite directions from said assembly, said pivot ends being engageable in said sockets prior to attachment of said bridge to said frame members said bridge having opposite side edges of angular cross section, and the inner ends of said frame members having slots therein of similar cross-sectional shape to the side edges of said bridge to accommodate the side edges of said bridge, the engagement of said side edges of said bridge in said slots holding said frame members from separation, thereby holding said pivot ends engaged in said sockets at all times when said bridge is in place.

7. The structure of claim 6 and in which said bridge and said frame members are provided with apertures which are in registry when said bridge is in proper relation to said frame members, and including fastening means engageable in said aligned apertures to hold said bridge from disengagement with said frame members.

References Cited in the file of this patent
UNITED STATES PATENTS

| | | |
|---|---|---|
| 1,838,775 | Marciano | Dec. 29, 1931 |
| 2,516,764 | Ehlert et al. | July 25, 1950 |
| 2,580,859 | Steckler | Jan. 1, 1952 |
| 2,584,000 | Ehlert et al. | Jan. 29, 1952 |
| 2,737,848 | Crane | Mar. 13, 1956 |
| 2,842,029 | Roth | July 8, 1958 |
| 2,953,968 | Hoffmaster | Sept. 27, 1960 |